United States Patent

[11] 3,600,792

| [72] | Inventors | Robert Valluy<br>Massy;<br>Louis Maudinet, Palaiseau, both of, France |
|---|---|---|
| [21] | Appl. No. | 746,670 |
| [22] | Filed | July 22, 1968 |
| [45] | Patented | Aug. 24, 1971 |
| [73] | Assignee | Societe Alcatel S.A.<br>Paris, France |
| [32] | Priority | July 31, 1967 |
| [33] | | France |
| [31] | | 116,371 |

[54] METHOD OF SUPPRESSING VIBRATIONS IN A BUNDLE OF PARALLEL TUBES
3 Claims, 2 Drawing Figs.

[52] U.S. Cl. ............................................. 29/428,
52/668, 165/172, 176/78
[51] Int. Cl. ....................................................... B23p 19/00
[50] Field of Search.......................................... 29/160,
190, 428, 455, 469; 176/76, 78; 52/668; 165/172

[56] References Cited
UNITED STATES PATENTS

| 2,849,943 | 9/1958 | Zurawski.................... | 29/160 X |
| 3,068,163 | 12/1962 | Currier et al. ................. | 176/78 |
| 3,423,287 | 1/1969 | Anthony et al. .............. | 176/76 |

FOREIGN PATENTS

| 1,381,787 | 11/1964 | France ......................... | 176/78 |
| 1,465,164 | 11/1966 | France ......................... | 176/76 |

Primary Examiner—Charlie T. Moon
Attorney—Bacon and Thomas

ABSTRACT: In order to suppress vibrations at a point of a bundle of parallel tubes without complicating the assembly of the bundle or entailing the need to dismantle the tube bundle after it has been installed, there is accordingly inserted between the tubes of the bundle a first series of parallel plates which are carried by an end-plate and which limit vibrations in a first direction, then a second series of parallel plates perpendicular to the first one for limiting the vibrations in a second direction, the two series of plates are then displaced by sliding in a longitudinal direction and thereby interassembled in such a manner that each tube is placed in a parallelepipedal recess while being in contact only with one or at a maximum with two of said plates, whereupon the two series of plates are rigidly fastened together.

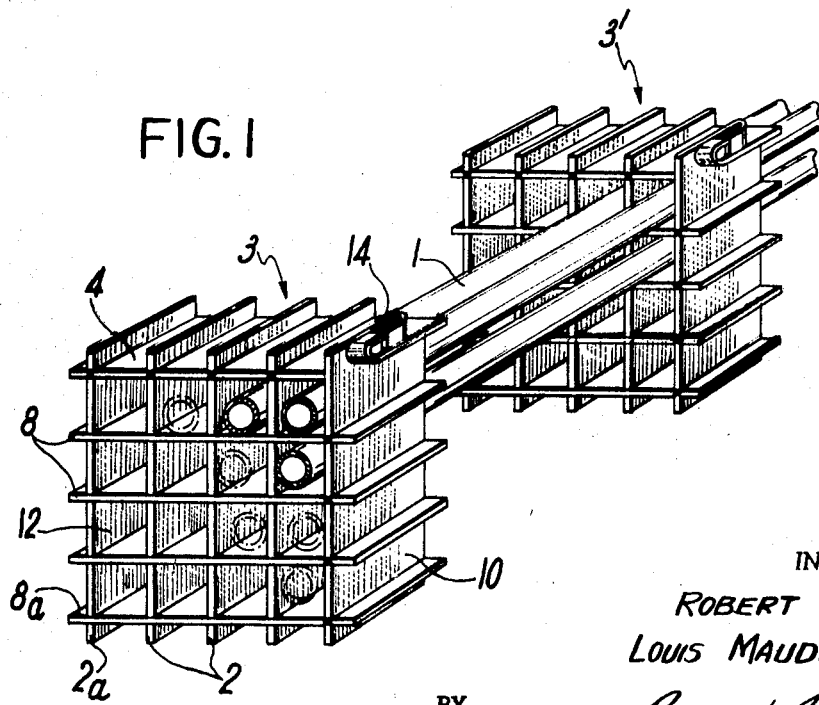

METHOD OF SUPPRESSING VIBRATIONS IN A BUNDLE OF PARALLEL TUBES

This invention relates to the suppression of vibrations in tubes and more particularly in tubes which are disposed in parallel relation in the form of a bundle or tube bank.

In the majority of cases, the tubes of a bundle of this type carry different fluids or only one fluid which is circulated under different conditions. In the latter instance, the bundle or bank of tubes is subjected to cyclic temperature differences and it proves necessary in order to prevent excessive thermal stresses to ensure that the tubes are capable of free expansion and consequently that they are secured with minimum rigidity.

Moreover, in a large number of applications, the tubes are liable to be subjected to vibrations, either due to the fact that they are placed in a gas stream which circulates at right angles thereto or which has a component at right angles to the axes of the tubes or by reason of the fact that the pressure of the fluid which flows through the tubes is liable to attain values which are at least momentarily critical. In order to prevent such vibrations, it would be necessary to secure the tubes as rigidly as possible.

In order to reconcile those two requirements, consideration has been given to the possibility of placing at different points along the tubes plates which are pierced by holes closely related in diameter to that of the tubes. The tubes must then be passed through these holes progressively as they are being assembled. The diameter of the holes can either be equal to that of the tubes and thus constitute a press-fitting or, on the contrary, can be slightly larger than that of said tubes and form a flexible connection. However, irrespective of the diameter, the assembly of the plates must be carried out as the assembly of the tube bundle proceeds and is extremely difficult when the ends of the tubes are reinforced or bent.

The aim of the present invention is to overcome these difficulties and to eliminate dangerous vibrations of tubes by virtue of a change in the mode of vibration which can be carried out on a bundle which is already in position, irrespective of its positional arrangement or configuration.

This invention is directed to a method of suppression of vibrations which consists in sliding at right angles to the axes of the tubes a first series of parallel members for limiting vibrations in a predetermined direction followed by a second series of members which are similar to the first and intended to act on the vibrations in a direction at right angles to the first and in interassembling the two series of members so that each tube is in contact with at least one member but is surrounded by four other members and is subjected to only a limited stress.

By means of this method, vibrations nodes can be imposed at different points on tubes which are already fitted or, alternatively, the amplitudes of said vibrations can be reduced at these points to a very substantial extent, thereby preventing such vibrations from being harmful.

The invention extends to a device for the suppression of vibrations which permits the practical application of said method and comprises a first assembly of parallel plates having a variable spacing and defining parallelepipedal spaces, said plates being secured to an end-plate and inserted between the tubes of the bundle, a second assembly of parallel plates similar to the first assembly and secured to an end-plate for insertion between the tubes at right angles thereto so that each tube is in contact with at least one plate of either one assembly or the other and at a maximum with two plates thereof, transverse slots cut in the plates of each assembly and fitted over the other assembly, and means for the longitudinal fastening of the two assemblies.

The device herein described can readily be inserted in any tube bundle or bank which has already been placed in position, the assembly operation being performed both rapidly and without any need to displace any of the tubes, simply by interengaging the two plate assemblies.

The stress which is applied by the device to each tube remains very small, but vibrations cannot be produced in these tubes except by energies of higher value than those which are usually developed.

A number of other properties and advantages of the invention will in any case become apparent from the following description of one embodiment which is given by way of non-limitative example and illustrated in the accompanying drawings, in which:

FIG. 1 illustrates a portion of tube bundle in which vibrations are suppressed in accordance with the invention;

FIG. 2 is an exploded view of a vibration-suppressing device.

The tube bundle which is shown in FIG. 1 comprises a plurality of tubes 1 which are in parallel relation but disposed in a number of rows with different spacings. Two identical antivibration devices 3 and 3' have been mounted on the portion shown.

Each of these devices comprises a first series of parallel plates 2 secured at one end to a base plate 4 which is at right angles thereto, said plates 2 being inserted vertically, in the example shown in the figure, between the tubes 1 of the bundle, as well as a second series of plates 8 which are parallel to each other and also secured at one end to a base plate 10, said second series being introduced between the tubes 1 at right angles to the plates 2.

The plates 2 and 8 are interassembled so as to form a series of parallelepipedal spaces 12 each surrounding one of the tubes 1. Inside the spaces 12, each tube 1 is in contact at least with one of the plates 2 or 8 and at a maximum with two of said plates, the spacing of the plates 2 and of the plates 8 having been determined according to the shape and pitch of the tube bundle 1.

In addition, the end-plates 4 and 10 are maintained in close contact, for example by means of a tongue 14 which is cut in each end-plate and bent back into the shape of a U so as to be applied in abutting contact with the corresponding tongue of the other plate.

In the form of construction which is illustrated in the drawings, the plates 2 are provided with parallel slots 16 to one half their height so as to permit of their engagement in identical slots 18 of the plates 8. Similarly, each plate 2 or 8 is inserted in slots 20 of the end-plate 4 or 10, then joined to said plate, for example by welding. Welding may be performed in the workshop prior to transportation of the plate assemblies 2 and 4 or 8 and 10 to the point of assembly with the tube bundle.

Each assembly of parallel plates 2 or 8 which are secured to their end-plate 4 or 10 has substantially the shape of a comb which can be inserted separately into the bundle of tubes, each plate being inserted by sliding between the adjacent tubes. These two assemblies are thus mounted at right angles to each other on the tube bundle at relatively close locations, then displaced laterally towards each other until the moment when the plates 8 engage within the plates 2 so as to secure the two combs with respect to each other. The lateral extremities of the end-plates 4 and 10 can then be fastened together. Similarly, the outer plates 2a—8a of the two assemblies could be fastened together.

Inside the parallelepipedal spaces 12, the tubes 1 are in close contact with at least one of the plates and sometimes two plates but leave a small clearance in the other directions. The vibrations in the different directions and especially in the two directions at right angles to the plates can consequently have only limited amplitudes. The device therefore constitutes a flexible connection which changes the mode of vibration of the bundle by establishing a vibration node at the location of the device or at least by reducing the vibrations at this location to a very substantial extent.

The mode of vibration which is thus imposed on the tubes is such that substantial vibrations could be generated only by high energies of greater value than those usually developed in the tube bundle.

In some cases, especially when the number of tubes of the bundle is small, it is an advantage to join one of the base plates 4 or 10 by means of a rigid support (which has not been shown in the drawings) to a fixed structure such as, for example, the structure which supports the tube-bundle assembly as a whole. When the tubes are numerous, this rigid structure is not essential and the device is alone sufficient to exert on the tubes an action such that it reduces to a substantial extent the cyclic dynamic stresses which arise, for example, from the presence of an external fluid flow having a component at right angles to the axes of the tubes; in this case, any longitudinal displacement of the device must be prevented; a very slight flattening of the tube, for example, may prove sufficient for the purpose.

The device under consideration can readily be mounted on a tube bundle which has already been placed in position irrespective of the number of tubes which constitutes said bundle; in an extreme case, the device can even be employed for the purpose of suppressing the vibrations of a single tube which is subjected to internal pressure vibrations or to an external fluid flow when it proves impossible to secure said tube directly in a rigid manner.

Moreover, the tubes are capable of free expansion independently of each other without thereby entailing any danger of modification of the antivibration device.

The method in accordance with the invention has been applied, for example, to a bank of tubes having an external diameter of 10 mm. and a length of 1.70 m., said tubes being fixed in a housing at each end and subjected to a crosswind of the order of 28 m./sec.

It has been found that, in the case of two devices placed at a distance from each end of the tube bank corresponding to one quarter of the length of this latter, dynamic stresses were reduced to values of less than 1 kg./mm.$^2$ whereas the dynamic stresses attained and even exceeded 25 kg./mm.$^2$ when no device was present.

Preferably, the device is fabricated from a material which possesses a sufficient degree of hardness with respect to the material which constitutes the tubes in order to prevent any harmful friction and consequently to prevent any danger of jamming of the tubes in the plates. The device can easily withstand an extremely long period of use without any danger of damage to the tubes and therefore without calling for any inspection or other maintenance.

The simplicity of the device as well as the ease and rapidity with which it can be assembled make it particularly inexpensive, especially by reason of the fact that any burrs resulting from machining of plates and especially from cutting of the slots do not need to be removed since they are located at the time of assembly in the corners of the parallelepipedal spaces and consequently will not be in contact at all with the tubes which are placed within said spaces.

As will be readily understood, a number of different modifications could be made in the form of construction which has just been described without thereby departing from the scope of the invention. For example, the plates could be inserted in slots disposed in a manner which differs from the foregoing and/or the plate assemblies could be coupled longitudinally by any other means.

We claim:

1. A method of assembling a device for the suppression of vibrations in a bundle of fixed parallel tubes which consists in sliding between adjacent tubes at right angles to the axes of the tubes a first series of parallel members for limiting vibrations in a predetermined direction, sliding between adjacent tubes of the bundle at right angles to the axes of the tubes and at right angles to and axially spaced from said first series of parallel members a second series of parallel members which are similar to the first series for limiting vibrations in a direction at right angles to said predetermined direction, and in interassembling the two series of members to form a series of parallelepipedal spaces with at least one of adjacent members of each of said series having a small clearance with the outer wall of the tube disposed therebetween so that a portion of each tube is in contact with at least one member of one of said series while being surrounded by portions of four members and subjected to only a limited stress.

2. A method in accordance with claim 1, wherein each tube is in contact with one member of each of said first and second series of members at maximum.

3. A method in accordance with claim 1, wherein both series of members are rigidly fixed to the stationary tube support after being interassembled within the bundle of fixed tubes.